United States Patent
Chan et al.

(10) Patent No.: US 7,591,673 B2
(45) Date of Patent: Sep. 22, 2009

(54) COMBINED POWER AND CONTROL SIGNAL CABLE

(75) Inventors: Kenneth Chan, Fremont, CA (US); Peter K. Lee, San Jose, CA (US); John William Pennington, Jr., Mountain View, CA (US); Donald Gonzalez, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/624,671

(22) Filed: Jan. 18, 2007

(65) Prior Publication Data

US 2008/0176444 A1 Jul. 24, 2008

(51) Int. Cl.
*H01R 11/00* (2006.01)
(52) U.S. Cl. .................................. 439/502; 439/638
(58) Field of Classification Search .......... 439/502, 439/638
See application file for complete search history.

(56) References Cited

U.S. PATENT DOCUMENTS

| | | | |
|---|---|---|---|
| 5,752,049 A | 5/1998 | Lee | |
| 6,114,362 A * | 9/2000 | Dutzmann et al. | 514/341 |
| 6,357,011 B2 | 3/2002 | Gilbert | |
| 6,719,591 B1 * | 4/2004 | Chang | 439/638 |
| 6,790,077 B1 * | 9/2004 | Chen | 439/502 |
| 6,855,881 B2 * | 2/2005 | Khoshnood | 174/15.1 |
| 6,964,586 B2 * | 11/2005 | Siddiqui | 439/669 |
| 2004/0200631 A1 | 10/2004 | Chen | |
| 2006/0164447 A1 | 7/2006 | Poole | |
| 2008/0078578 A1 * | 4/2008 | Wang et al. | 174/72 R |

FOREIGN PATENT DOCUMENTS

| | | |
|---|---|---|
| KR | 20-1994-0025495 | 11/1994 |
| KR | 20-1998-049163 | 10/1998 |
| KR | 20-1999-0023150 | 7/1999 |

OTHER PUBLICATIONS

International Search Report issued Jun. 18, 2008 in counterpart foreign application under the WIPO, application No. PCT/US2008/000724.

* cited by examiner

*Primary Examiner*—Truc T Nguyen

(57) ABSTRACT

A power/control cable for transmitting control signals and power is described. The power/control cable comprises a first connector comprising a first control signal conductor and a first electrical charge conductor, a second connector comprising a second control signal conductor communicatively connected with the first connector by at least one wire, and a third connector comprising a second electrical charge conductor electrically connected with the first connector by at least one wire.

18 Claims, 4 Drawing Sheets

COMBINED POWER AND CONTROL SIGNAL CABLE

BACKGROUND

Existing printing systems require use of an external power adapter, e.g., an AC/DC power supply, to provide power to a printer in addition to a data cable, e.g., a universal serial bus (USB) cable, to transmit data to/from the printer and the computer system. Multiple cables and additional power units are required and cable management cannot be optimized. If a user needs to relocate the computer system or the printer, the user needs to unplug the USB cable and power unit and cable and carry the printer to a new location and reconnect the printer to the computer system. Multiple cables increase both the cost and weight of the printer and/or the computer system.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
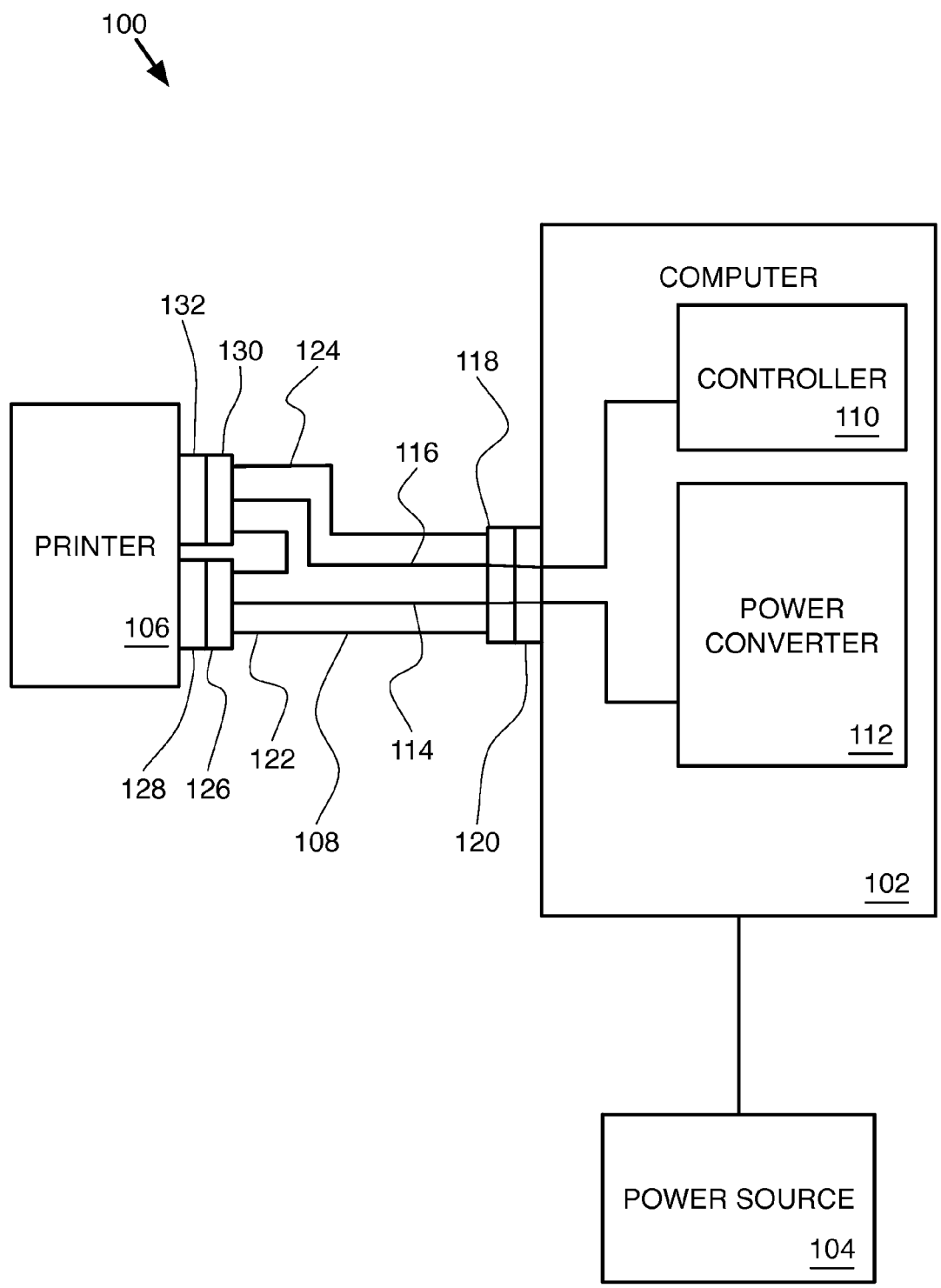
FIG. 1 is a high level functional block diagram of an embodiment.

FIG. 1 depicts a combined computer and printer system 100 in conjunction with which an embodiment of the present invention may be used to advantage. The combined system 100 comprises a computer system 102 electrically connected with a power source 104 and a printer 106 electrically and communicatively connected with the computer system. A power/control (P/C) cable 108 connects computer system 102 and printer 106 and enables the exchange of data and control signals between the computer system and the printer and the transmission of power from the computer system to the printer.

Computer system 102 comprises a controller 110, e.g., a processor or other logic device, etc., for controlling operation of the computer system and communicating with printer 106 via P/C cable 108. In some embodiments, controller 110 communicates directly and/or indirectly with printer 106 via P/C cable 108.

Computer system 102 further comprises a power converter 112, e.g., a power supply, for converting a source current, e.g., an alternating current (AC), received from power source 104 to a supply current, e.g., a direct current (DC) usable internally and/or externally to the computer system. In some embodiments, power converter 112 may be an AC/DC converter. In some other embodiments, power converter 112 may be a DC/AC converter. In some other embodiments, power converter 112 may convert the source current from one frequency, voltage, phase, or other property to another frequency, voltage, phase, property. Power converter 112 provides a supply current to computer system 102.

Power source 104 supplies source current to computer system 102. In some embodiments, power source 104 may be a main AC power source, e.g., a 110 or 220 volt source. In some embodiments, power source 104 may be a battery or storage-based power source. In some embodiments, power source 104 may supply a source current as an AC or DC current to computer system 102.

Printer 106 communicates with computer system 102 via P/C cable 108 and receives an operating current from the computer system. The operating current provides an electrical charge to drive operation of printer 106, e.g., to operate a print head, logic board, roller, and/or other components of the printer.

P/C cable 108 comprises an electrical current conductor 114 ("power conductor"), e.g., a pair of wires, for transferring an electrical charge ("power") from computer system 102 to printer 106 to drive operation of the printer. P/C cable 108 also comprises a control signal conductor 116, e.g., a wire, for transferring one or more control signals and/or data signals between computer system 102 and printer 106. In some embodiments, P/C cable 108 comprises two or more control signal conductors, e.g., as in a universal serial bus (USB) cable, parallel port cable, or other type of data and/or control communication cable.

P/C cable 108 comprises a combined power and control (CP/C) connector 118 at an end of the cable to be connected to computer system 102. CP/C connector 118 electrically connects electrical current conductor 114 and control signal conductor 116 to corresponding electrical connections on computer system 102 by interfitting with a corresponding computer connector 120 of the computer system.

Computer connector 120 electrically connects electrical current conductor 114 of P/C cable 108 to power converter 112 and electrically connects control signal conductor 116 of the P/C cable to controller 110. In some embodiments, power converter 112 drives an electrical current, via computer connector 120 and electrical current conductor 114, to printer 106 at a predetermined voltage level and/or a predetermined current level. In some embodiments, the predetermined voltage level is 32 Volts and/or the predetermined current level is 0.9 Amperes. In some embodiments, controller 110 comprises a USB controller and computer connector 120 and CP/C connector 118 each comprise USB connectors.

P/C cable 108 splits into two pieces at a position toward an opposing end of the P/C cable from CP/C connector 118. After the split, P/C cable comprises a first leg 122 comprising electrical current conductor 114 and a second leg 124 comprising control signal conductor 116.

First leg 122 comprises a power connector 126 at an end of P/C cable 108 distal from CP/C connector 118. Power connector 126 electrically connects electrical current conductor 114 to a corresponding electrical connection on printer 106 by interfitting with a corresponding printer power connector 128 of the printer. In some embodiments, printer power connector 128 may be a DC power connector, an AC power connector, or another connector for transferring current to printer 106.

Second leg 123 comprises a control connector 130 at an end of P/C cable 108 distal from CP/C connector 118. Control connector 130 electrically connects control signal conductor 116 to a corresponding signal connection on printer 106 by interfitting with a corresponding printer control connector 132 of the printer. In some embodiments, printer control connector 132 may be a serial port, a parallel port, a USB connector, or another printer communication connection.

Figure 3:
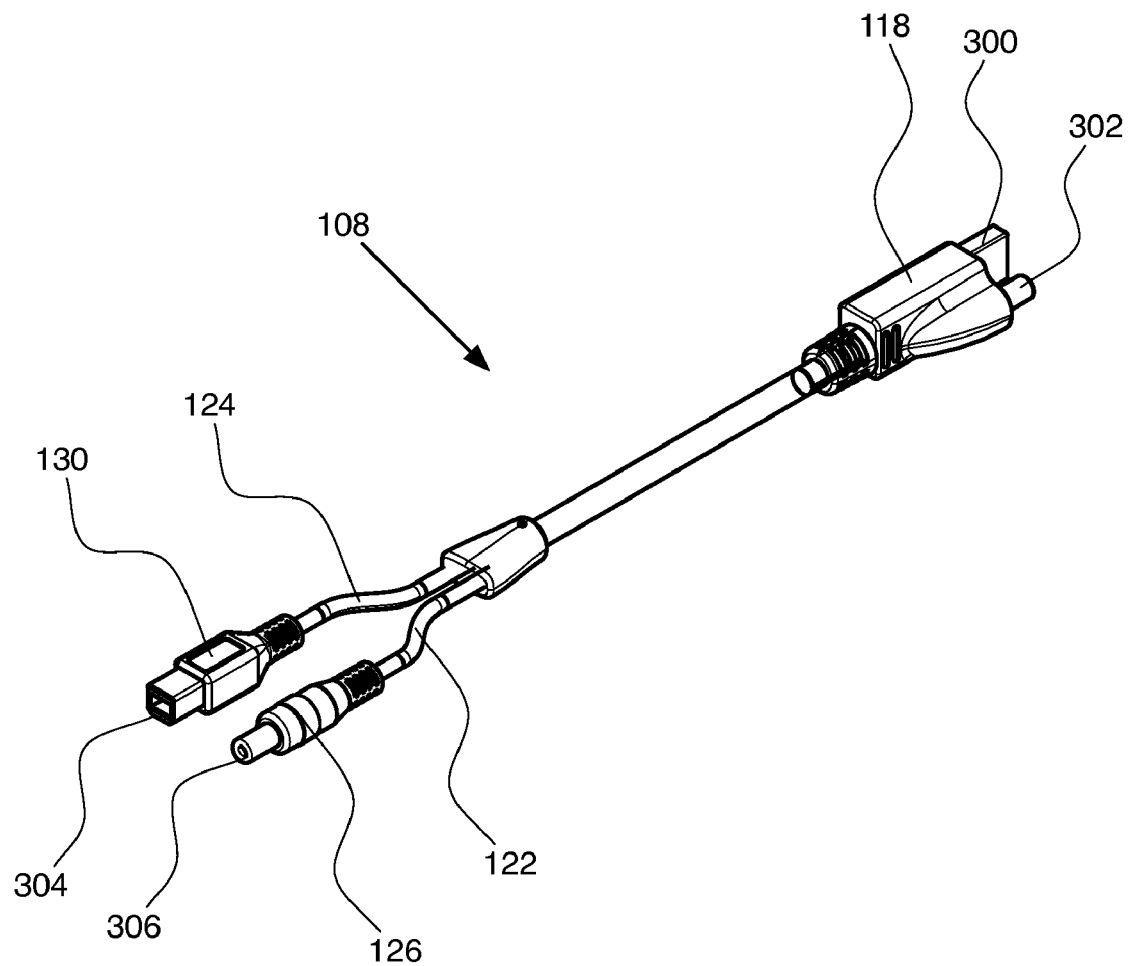
FIGS. 3 and 4 are an example cable according to an embodiment.
Figure 4:
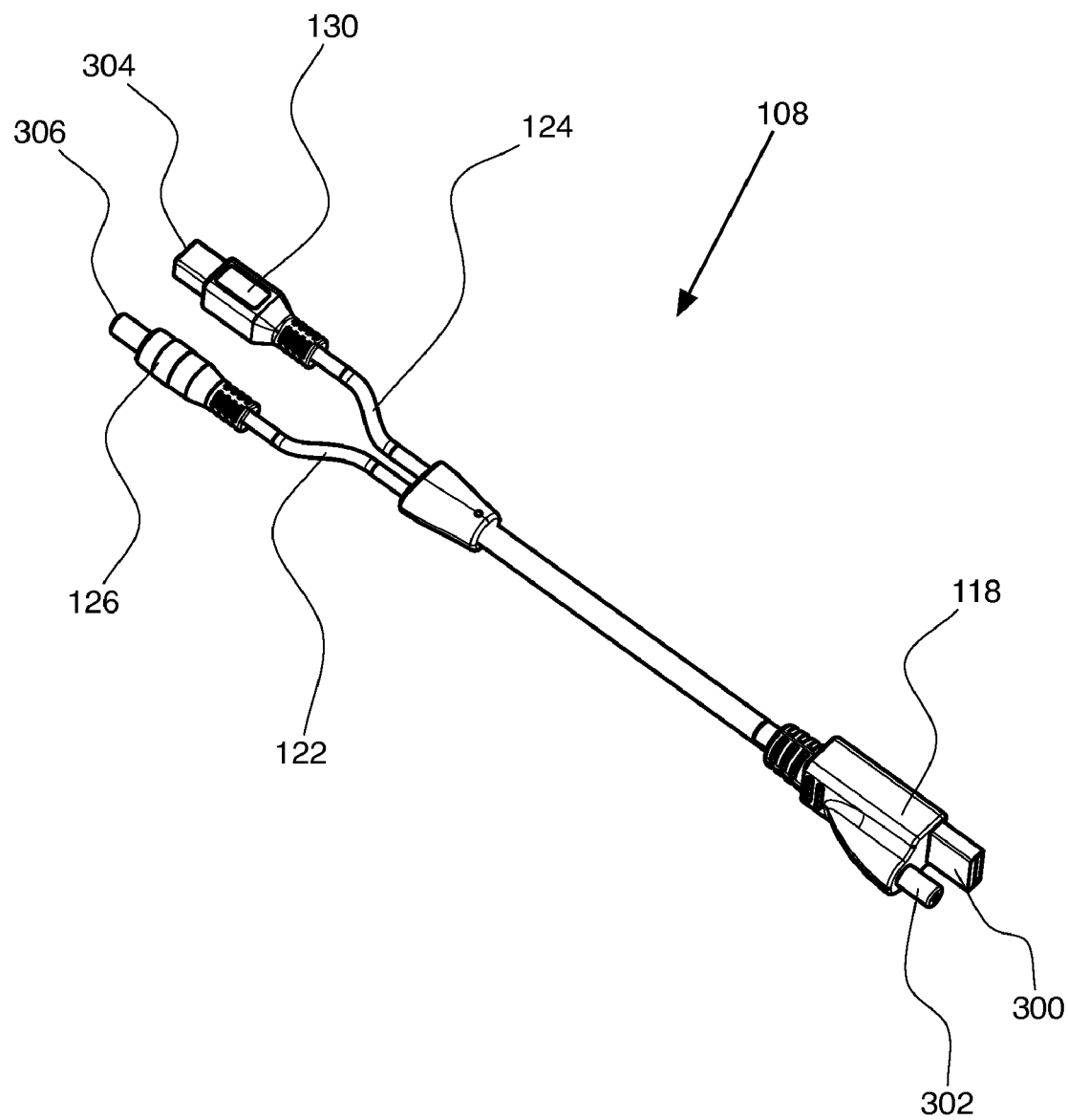

FIGS. 3 and 4 depict an example cable 108 according to an embodiment. CP/C connector 118 comprises a USB connector 300, i.e., a USB A-type connector, and a power plug 302. Control connector 130 comprises a USB connector 304, i.e., a USB B-type connector. In some embodiments, USB connector 300 and USB connector 304 may be the same type of connector, e.g., both USB A or USB B-type connectors. In some embodiments, control connector 130 and CP/C connector 118 may comprise a different connector type for transferring control signals, e.g., Institute of Electrical and Electronics Engineers (IEEE) standard 1394 (FIREWIRE) connectors, serial and/or parallel connectors, etc. Power connector 126 comprises a power plug 306. In some embodiments, power plugs 302 and 306 are similarly configured.

In this manner, a single cable, i.e., P/C cable 108, providing both power and control signals, connects computer system 102 and printer 106. Further, a separate power supply, e.g., a separate AC/DC power converter, for printer 106 is not required as computer system 102 supplies electrical power to directly power the printer. Thus, in some embodiments, the number of required cables is reduced to a single cable connecting printer 106 and computer system 102.

Figure 2:
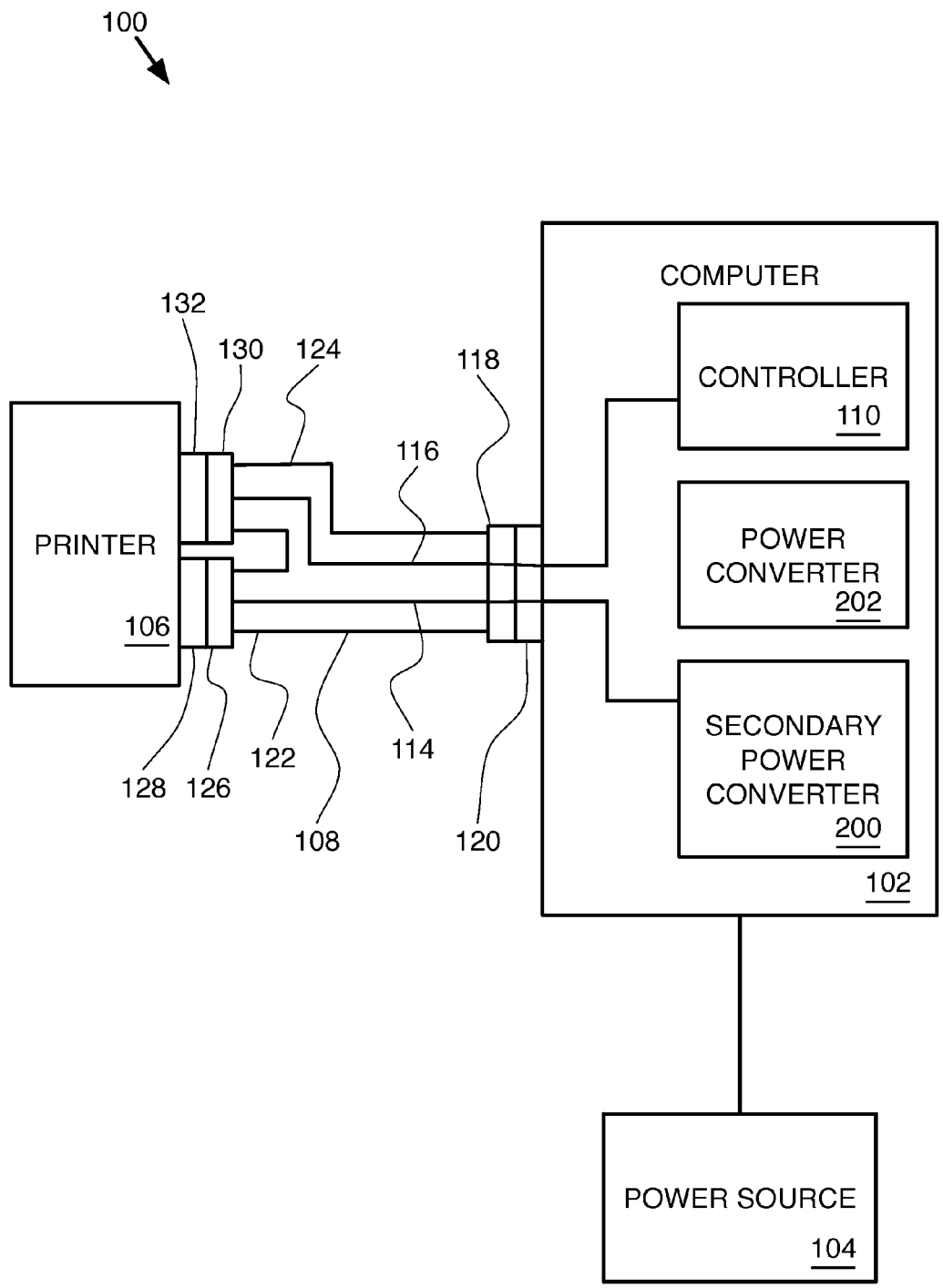
FIG. 2 is a high level functional block diagram according to another embodiment.

FIG. 2 depicts another embodiment in which computer system 102 comprises a secondary power converter 200 for providing an electrical current to printer 106 sufficient to drive the printer operation. Power converter 202 receives a portion of the source current from power source 104 and provides a supply current to computer system 102, e.g., controller 110. Secondary power converter 200 receives a portion of the source current from power source 104 and provides the supply current to printer 106 via P/C cable 108.

What is claimed is:

1. A power/control cable for transmitting control signals and power from a computer system to a printer, the computer system comprising a controller and a power converter, the power/control cable comprising first and second ends and comprising:
    a first connector for the computer system located at the first end of the power/control cable proximate to the computer system and comprising a universal serial bus (USB) connector for the computer system for electrically connecting a first control signal conductor to the controller of the computer system and a power plug for the computer system for electrically connecting a first power conductor to the power converter of the computer system; and
    the second end located distal from the computer system and proximate to the printer and split into a first leg and a second leg,
    wherein the first leg comprises a control connector for the printer for transferring the control signals from the computer system to the printer, the control connector for the printer comprising a USB connector for the printer for interfacing with a printer USB connector, and
    wherein the second leg comprises a power connector for the printer for transferring the power from the computer system to the printer without using a separate power supply.

2. The power/control cable of claim 1, wherein the first leg of the power/control cable located at the second end distal from the computer system comprises a second control signal conductor communicatively connected with the first control signal conductor.

3. The power/control cable of claim 1, wherein the second leg comprises an electrical connector arranged to transfer at least one of 32 volts and 0.9 amperes.

4. The power/control cable of claim 1, wherein the power/control cable connects the power connector of the printer directly to the computer system.

5. The power/control cable of claim 1, wherein the single power/control cable provides both the control signals and the power from the computer system to the printer.

6. The power/control cable of claim 2, wherein the second leg of the power/control cable located at the second end distal from the computer system comprises a second power conductor electrically connected with the first power conductor.

7. A computer system and a cable for connection with a printer, comprising:
    a computer system comprising a power converter and a controller; and
    a power/control cable comprising first and second ends, wherein the power/control cable is arranged to transmit a control signal and power from the computer system to the printer, and comprising:
        a first connector for the computer system located at the first end of the power/control cable proximate to the computer system and comprising a universal serial bus (USB) connector for the computer system for electrically connecting a first control signal conductor to the controller of the computer system and a power plug for the computer system for electrically connecting a first power conductor to the power converter of the computer system; and
        the second end located distal from the computer system and proximate to the printer and split into a first leg and a second leg,
        wherein the first leg comprises a control connector for the printer for transferring the control signals from the computer system to the printer, the control connector for the printer comprising a USB connector for the printer for interfacing with a printer USB connector, and
        wherein the second leg comprises a power connector for the printer for transferring the power from the computer system to the printer without using a separate power supply.

8. The computer system and cable of claim 7, wherein the first leg of the power/control cable located at the second end distal from the computer system comprises a second control signal conductor communicatively connected with the first connector by at least one wire.

9. The computer system and cable of claim 7, wherein the second leg of the power/control cable located at the second end distal from the computer system comprises a second power conductor electrically connected with the first connector by at least one wire.

10. The computer system and cable of claim 7, wherein the computer system comprises
    a first power converter arranged to provide current to the computer system; and
    a secondary power converter arranged to provide current to the first power conductor.

11. The computer system and cable of claim 7, wherein the first connector of the power/control cable is a combined connector, wherein the USB connector for the computer system and the power plug for the computer system are located adjacent to each other on a same combined plug, and wherein the computer system comprises a combined receiver that receives the combined plug of the power/control cable.

12. The computer system and cable of claim 9, wherein the second leg comprises an electrical connector operatively connected with the second power conductor.

13. The computer system and cable of claim 12, wherein the electrical connector is arranged to transfer at least one of 32 volts and 0.9 amperes.

14. The computer system and cable of claim 10, wherein the secondary power converter is arranged to provide at least one of 32 volts and 0.9 amperes.

15. The computer system and cable of claim 10, wherein the secondary power converter is arranged to drive a supply current of a size to operate a printer.

16. The computer system and cable of claim 10, wherein the secondary power converter is arranged to drive a direct current supply current to the first power conductor.

17. A printer and a power/control cable connectable between the printer and a computer system, comprising:
- a printer comprising a printer power connector and a printer control connector;
- a power/control cable for transmitting a control signal and power from the computer system to the printer, the power/control cable comprising first and second ends and comprising:
  - a first connector for the computer system located at the first end of the power/control cable proximate to the computer system and comprising a universal serial bus (USB) connector for the computer system for electrically connecting a first control signal conductor to the controller of the computer system and a power plug for the computer system for electrically connecting a first power conductor to the power converter of the computer system; and
  - the second end located distal from the computer system and proximate to the printer and split into a first leg and a second leg,
  - wherein the first leg comprises a control connector for the printer for transferring the control signals from the computer system to the printer, the control connector for the printer comprising a USB connector for the printer for interfacing with the printer control connector, and
  - wherein the second leg comprises a power connector for the printer for transferring the power from the computer system to the printer without using a separate power supply, the power connector for the printer interfacing with the printer power connector.

18. The printer and power/control cable of claim 17, wherein the printer control connector is a USB connector.

* * * * *